(12) United States Patent
Liu et al.

(10) Patent No.: US 10,341,116 B2
(45) Date of Patent: Jul. 2, 2019

(54) REMOTE ATTESTATION WITH HASH-BASED SIGNATURES

(71) Applicant: Intel Corporation, Santa Clara, CA (US)

(72) Inventors: Xiruo Liu, Portland, OR (US); Rafael Misoczki, Hillsboro, OR (US); Manoj R Sastry, Portland, OR (US); Santosh Ghosh, Hillsboro, OR (US); Li Zhao, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 229 days.

(21) Appl. No.: 15/392,266

(22) Filed: Dec. 28, 2016

(65) Prior Publication Data

US 2018/0183603 A1 Jun. 28, 2018

(51) Int. Cl.
 *H04L 9/06* (2006.01)
 *H04L 9/14* (2006.01)
 *H04L 9/30* (2006.01)
 *H04L 9/32* (2006.01)

(52) U.S. Cl.
 CPC .......... *H04L 9/3247* (2013.01); *H04L 9/0643* (2013.01); *H04L 9/14* (2013.01); *H04L 9/30* (2013.01); *H04L 9/3236* (2013.01); *H04L 2209/80* (2013.01)

(58) Field of Classification Search
 CPC ....... H04L 9/3247; H04L 9/0643; H04L 9/14; H04L 9/30; H04L 9/3236
 USPC .......................................................... 713/176
 See application file for complete search history.

(56) References Cited

U.S. PATENT DOCUMENTS

| | | | | |
|---|---|---|---|---|
| 2010/0293373 | A1* | 11/2010 | McBrearty | G06F 21/577 713/168 |
| 2012/0023328 | A1* | 1/2012 | Xiao | G06F 21/33 713/156 |
| 2012/0060039 | A1* | 3/2012 | Leclercq | G06F 21/10 713/189 |
| 2014/0095866 | A1* | 4/2014 | Grebennikov | H04L 9/3268 713/156 |
| 2015/0264021 | A1* | 9/2015 | Schulz | H04L 63/0414 713/170 |

* cited by examiner

*Primary Examiner* — Michael S McNally
(74) *Attorney, Agent, or Firm* — Schwegman Lundberg & Woessner, P.A.

(57) ABSTRACT

An attestation protocol between a prover device (P), a verifier device (V), and a trusted third-party device (TTP). P and TTP have a first trust relationship represented by a first cryptographic representation based on a one-or-few-times, hash-based, signature key. V sends an attestation request to P, with the attestation request including a second cryptographic representation of a second trust relationship between V and TTP. In response to the attestation request, P sends a validation request to TTP, with the validation request being based on a cryptographic association of the first trust relationship and the second trust relationship. TTP provides a validation response including a cryptographic representation of verification of validity of the first trust relationship and the second trust relationship. P sends an attestation response to V based on the validation response.

23 Claims, 9 Drawing Sheets

REMOTE ATTESTATION WITH HASH-BASED SIGNATURES

TECHNICAL FIELD

Embodiments described herein generally relate to information processing and security, more particularly, to assuring the authenticity of a device's hardware, firmware or software, to a remote verifier.

BACKGROUND

Processor-based computing platforms are employed in a wide variety of applications, from personal computers (PCs), smartphones, and other information-oriented devices, to industrial controls, vehicles, appliances, consumer electronic articles, and wearable devices, just to name a few. In virtually every application, reliable operation and information security are paramount More recently, with the rising popularity of Internet-of-Things (IoT) devices, entities who own, operate, maintain, or support IoT devices are facing increasing challenges associated with exchanging information remotely with those devices. There is a need for computing platforms to attest the integrity of their hardware, firmware or software.

Conventional remote attestation mechanisms are generally based on either symmetric cryptography or asymmetric cryptography. The symmetric solutions are efficient but depend on pre-sharing a common cryptographic key and do not offer non-repudiation. Conventional asymmetric solutions, which may be based on elliptic curve cryptography (ECC) or Rivest-Shamir-Adleman (RSA) cryptosystems, do not have this limitation but tend to be very inefficient in terms of performance/power, to the point of being impracticable for implementation in computing-constrained platforms such as IoT devices. Another disadvantage of conventional cryptography is that it is vulnerable to the potential risk of quantum-computing attacks, which should be taken into consideration by system designers, particularly because many IoT devices are expected to deployed in the field for a long time, possibly extending into the in a post-quantum-computing era.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
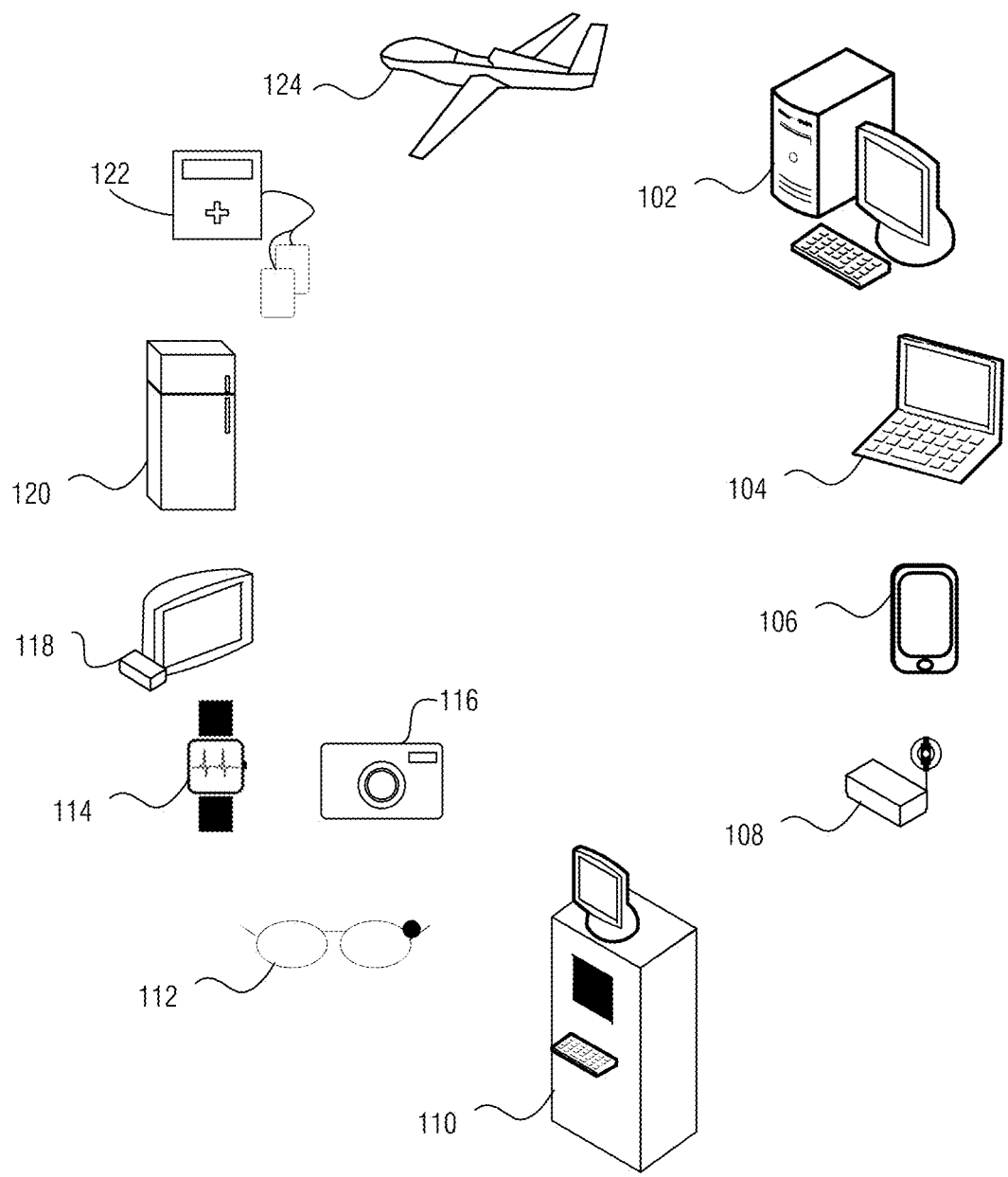
FIG. 1 is a high-level diagram illustrating examples of various types of computing platforms, including IoT platforms, on which aspects of the invention may be implemented according to some embodiments.

Aspects of the embodiments are directed to remote attestation of a computing device. In the present context, attestation refers to the validation of the integrity of the computing device (e.g., including its software, firmware or hardware). The attestation operation involves at least two parties: the prover, who is to present the proof of its integrity, and the verifier, who intends to verify the prover's integrity. In some embodiments, since the verifier and the prover do not necessarily trust or even know each other, a third party is introduced as a trust anchor to facilitate the remote attestation process.

According to the embodiments described below, three parties are involved in an attestation process: a prover (P), a verifier (V), and a trusted third party (TTP). The P is a computing entity that is to prove its current device integrity status to the verifier. V is a computing entity that intends to obtain attestation of the current device integrity status of the prover. TTP is a computing entity that is trusted by both P and V, and carries out a facilitation role in a remote-attestation protocol to be executed.

As an example usage scenario for a smart home application, V may be a smartphone, P may be a thermostat, and TTP may be a manufacturer of the thermostat In an example usage scenario for a public safety system, V may be a computing entity operated by an agency such as a Department of Public Safety, P may be a security camera, and TTP may be a computing entity operated by the owner or operator of the security camera. As is evident from these diverse examples, P may have very different privacy needs depending on the usage scenario. For instance, in the smart home example, P as the thermostat may have minimal need for privacy; whereas in the public safety example, P may have a high need for privacy.

According to some embodiments, described in greater detail below, an efficient, asymmetric, post-quantum remote attestation protocol is based on hash-based signatures, and has an efficiency (in terms of computational operations) that makes it suitable for use with IoT devices. Any suitable hash-based signature scheme may be employed.

An attestation scheme involves P (e.g., an IoT device) to perform hash-based, one-or-few-times signature (OFTS) operations, such as one-time signature (OTS) or few-time signature (FTS) operations. Examples of an OTS are Lamport, Winterintz, and WOTS+ signatures, though other types of OTS are contemplated as well. An example of a FTS is one that is produced using a HORS technique.

OFTS signatures are significantly less computationally intensive than multi-time signature (MTS) operations. According to some embodiments, OFTS signatures are used where more frequent cryptographic computation is called for, or where the device performing the cryptographic operations is limited in its computing capacity, stored energy, or where time to complete the operation is essential, for example. In related embodiments, MTS is used where these types of restrictions are not significantly present, such as where devices have ample computational power, energy, or time to complete the cryptographic operations. In some embodiments, specially-configured OFTS operations may be used to perform multiple remote attestations. Examples of hash-based MTS include Merkle signatures, SPHINCS, XMSS, or the like.

Notably, MTS signatures do not necessarily enjoy an unlimited number of uses. Rather, MTS schemes apply a trade-off between computational complexity and number of uses of a key of a certain type. In certain cases, a relatively non-complex MTS scheme may have characteristics of a FTS signature scheme. Accordingly, in the present context, OFTS signatures are defined as using keys for which no more than 10 uses are contemplated.

As a simplified overview, P generates one-or-few-time signature (OFTS) ephemeral key pairs in response to a remote attestation request. Next, P requests that the OFTS public key be signed by TTP. The TTP-signed OFTS public key is retransmitted by P to V. In this way, V is assured of the authenticity of the OFTS public key, and therefore is able to verify that the remote attestation provided is authentic.

FIG. 1 is a high-level diagram illustrating some examples of various types of computing platforms, each of which may constitute P, V, or TTP. The computing platforms include servers or personal computers, such as PC 102, laptop 104, smartphone/tablet 106, and the like. Other types of information devices, such as networking appliance 108, which represents a switch, router, access point, etc., are computing platforms that are also contemplated. Industrial equipment 110, such as control systems, automated tooling, motor/robotics controls, programmable logic controllers, are also types of computing platforms on which aspects of the embodiments may be implemented. Computing platforms may also be implemented as consumer-electronic devices, such as smart glasses 112, smartwatch 114, digital camera 116, and media device 118, such as a set-top box as depicted, audio playback system, etc. Appliance 120 may also contain a computing system such as, for instance, an Internet-of-Things (IoT) node. Medical device 122 may contain an embedded computing platform. Likewise vehicle 124 may also contain one or more computing platforms. Each computing platform may include a processor-based system, e.g., a machine capable of executing instructions (sequential or otherwise) that specify actions to be taken by that machine.

Figure 2:
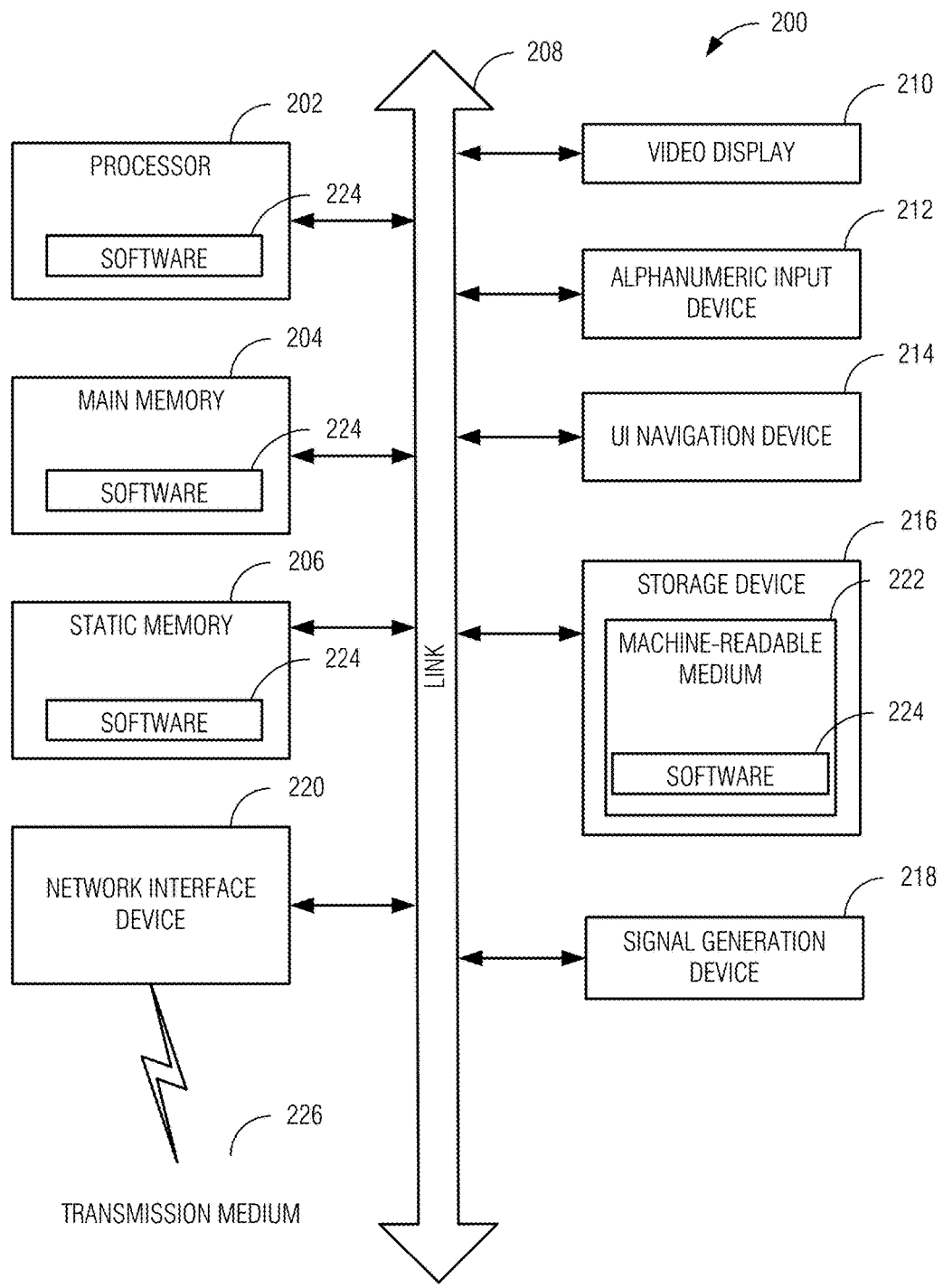
FIG. 2 is a block diagram illustrating a computer system in the example form of a general-purpose machine.

FIG. 2 is a block diagram illustrating a computer system 200 in the example form of a general-purpose machine. In certain embodiments, programming of the computer system 200 according to one or more particular algorithms produces a special-purpose machine upon execution of that programming. In a networked deployment, the computer system may operate in the capacity of either a server or a client machine in server-client network environments, or it may act as a peer machine in peer-to-peer (or distributed) network environments.

Example computer system 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computer system 200 may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The computer system 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computer system 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
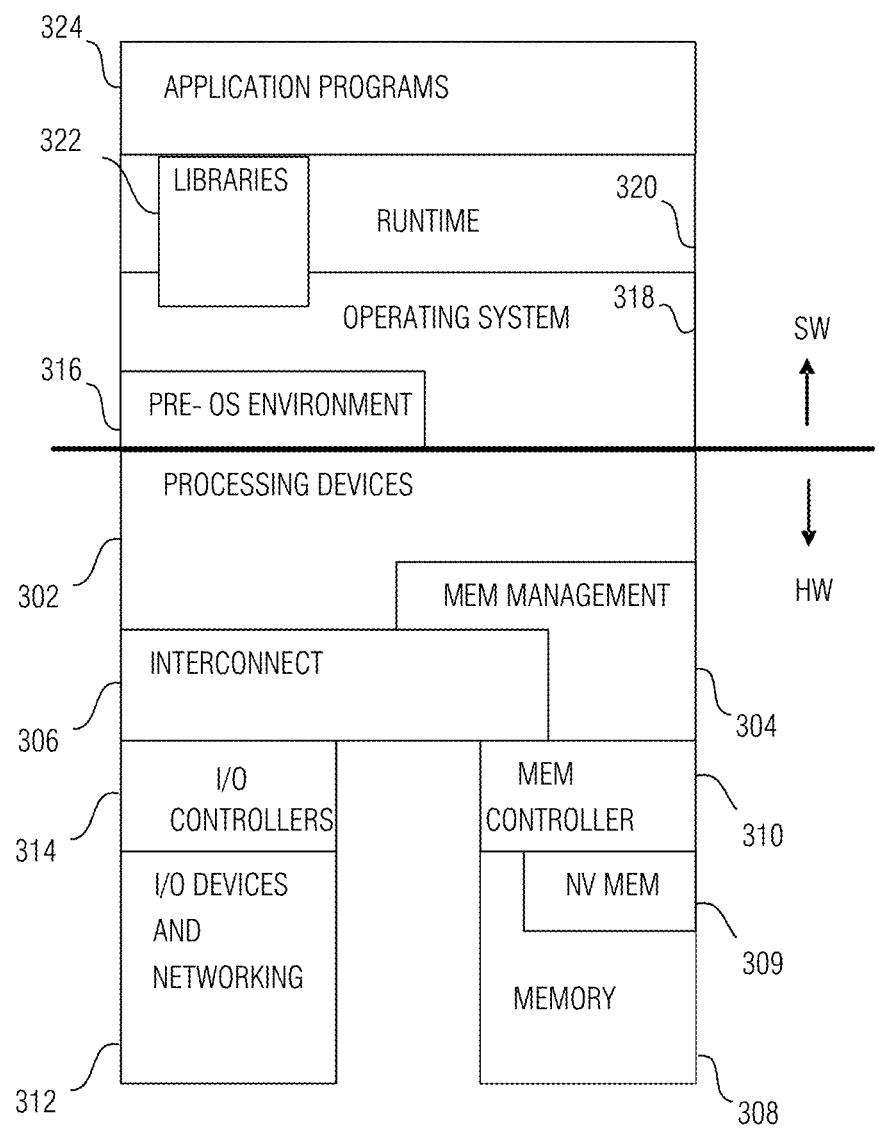
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
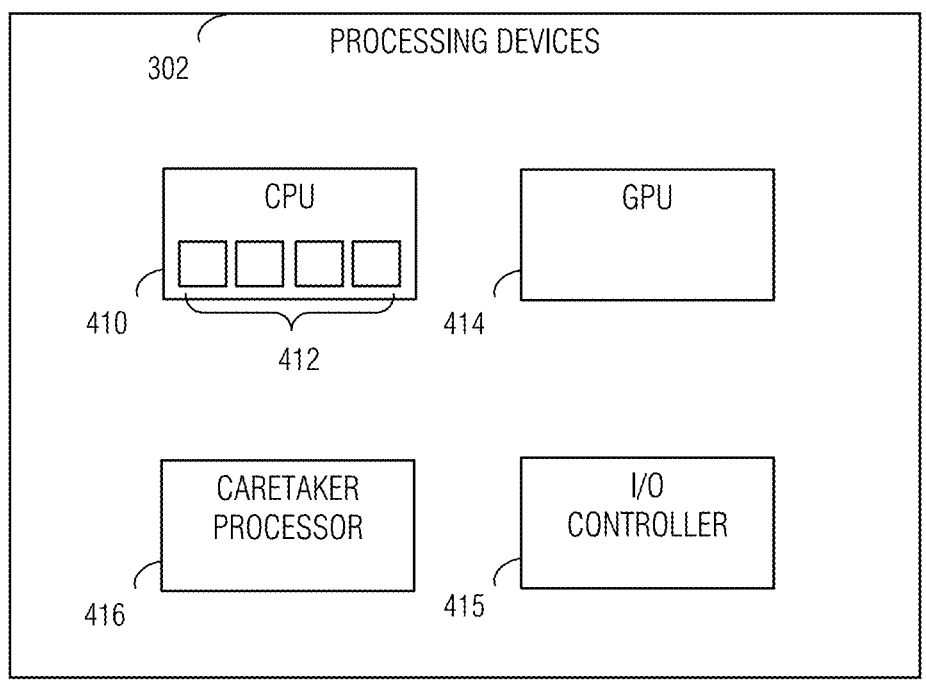
FIG. 4 is a block diagram illustrating examples of processing devices that may be implemented on a computer system, such as the computer system described with reference to FIGS. 2-3, according to some embodiments.

FIG. 4 is a block diagram illustrating processing devices 302 according to some embodiments. CPU 410 may contain one or more processing cores 412, each of which has one or more arithmetic logic units (ALU), instruction fetch unit, instruction decode unit, control unit, registers, data stack pointer, program counter, and other essential components according to the particular architecture of the processor. As an illustrative example, CPU 410 may be an x86-type of processor. Processing devices 302 may also include a graphics processing unit (GPU) 414. In these embodiments, GPU 414 may be a specialized co-processor that offloads certain computationally-intensive operations, particularly those associated with graphics rendering, from CPU 410. Notably, CPU 410 and GPU 414 generally work collaboratively, sharing access to memory resources, I/O channels, etc.

Processing devices 302 may also include caretaker processor 416 in some embodiments. Caretaker processor 416 generally does not participate in the processing work to carry out software code as CPU 410 and GPU 414 do. In some embodiments, caretaker processor 416 does not share memory space with CPU 410 and GPU 414, and is therefore not arranged to execute operating system or application programs. Instead, caretaker processor 416 may execute dedicated firmware that supports the technical workings of CPU 410, GPU 414, and other components of the computer system In some embodiments, caretaker processor is implemented as a microcontroller device, which may be physically present on the same integrated circuit die as CPU 410, or may be present on a distinct integrated circuit die. Caretaker processor 416 may also include a dedicated set of I/O facilities to enable it to communicate with external entities. In one type of embodiment, caretaker processor 416 is implemented using a manageability engine (ME) or platform security processor (PSP). Input/output (I/O) controller 415 coordinates information flow between the various processing devices 410, 414, 416, as well as with external circuitry, such as a system interconnect.

In one embodiment, two or more of processing devices 302 depicted are formed on a common semiconductor substrate.

Figure 5:
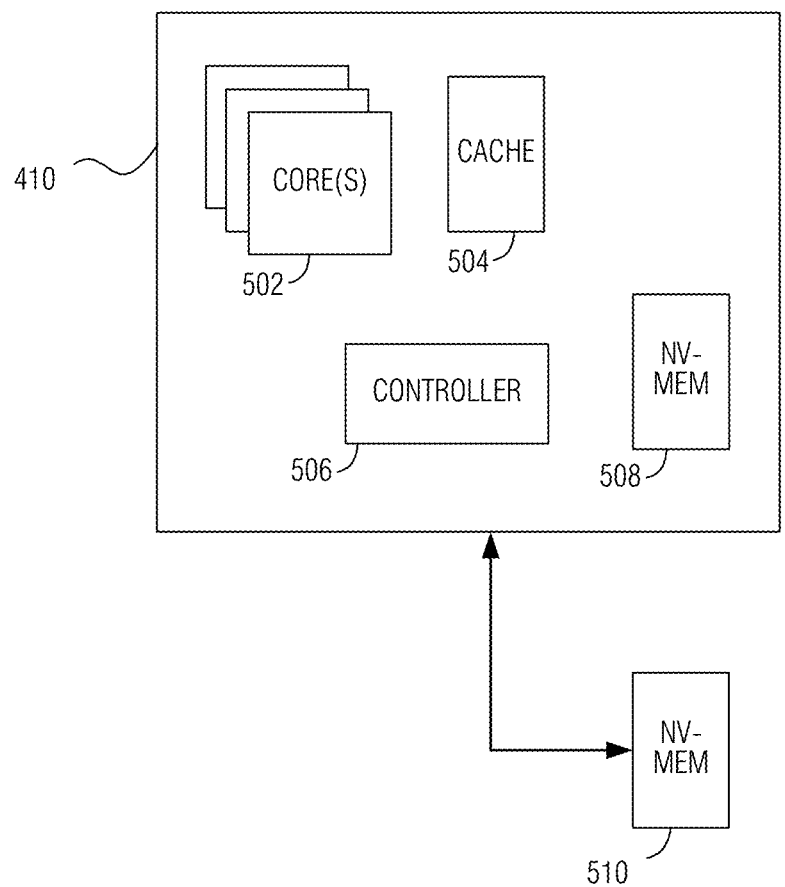
FIG. 5 is a block diagram illustrating example components of a CPU as one of the processing devices depicted in FIG. 4, according to various embodiments.

FIG. 5 is a block diagram illustrating example components of CPU 410 according to various embodiments. As depicted, CPU 410 includes one or more cores 502, cache 504, and CPU controller 506, which coordinates interoperation and tasking of the core(s) 502, as well as providing an interface to facilitate data flow between the various internal components of CPU 410, and with external components such as a memory bus or system interconnect. In one embodiment, all of the example components of CPU 410 are formed on a common semiconductor substrate.

CPU 410 includes non-volatile memory 508 (e.g., flash, EEPROM, etc.) for storing certain portions of foundational code, such as initialization instructions, and microcode. Also, CPU 410 may be interfaced with an external (e.g., formed on a separate IC) non-volatile memory device 510 that stores foundational code that is launched by the initialization instructions, such as system BIOS or UEFI code.

Figure 6A:
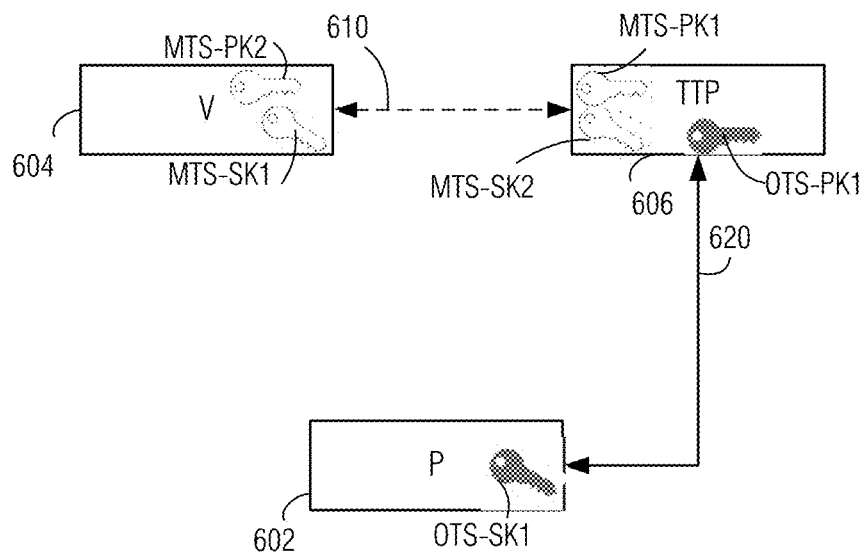
FIGS. 6A-6C are simplified information flow diagrams illustrating principal information exchanged during the stages of a three-party remote-attestation scenario according to some embodiments.
Figure 6B:
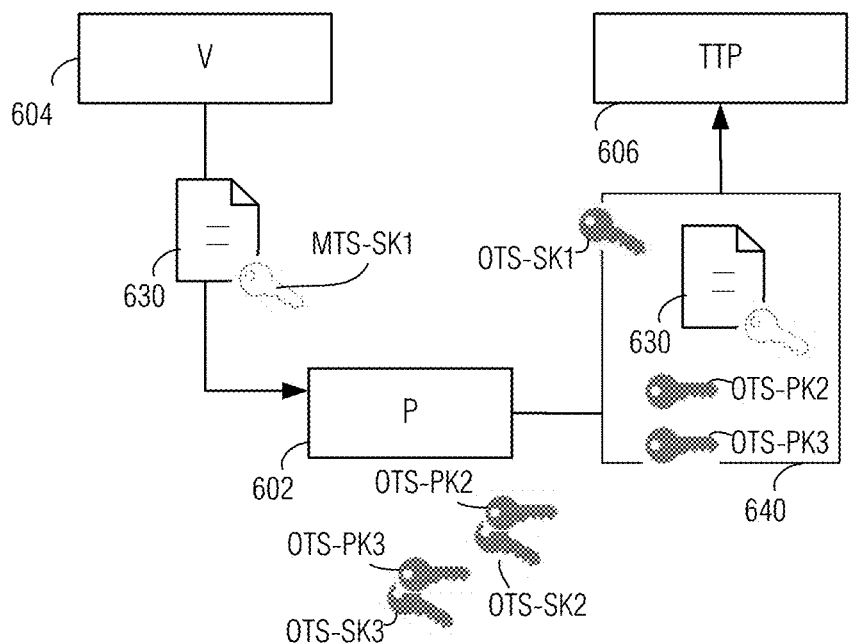
Figure 6C:
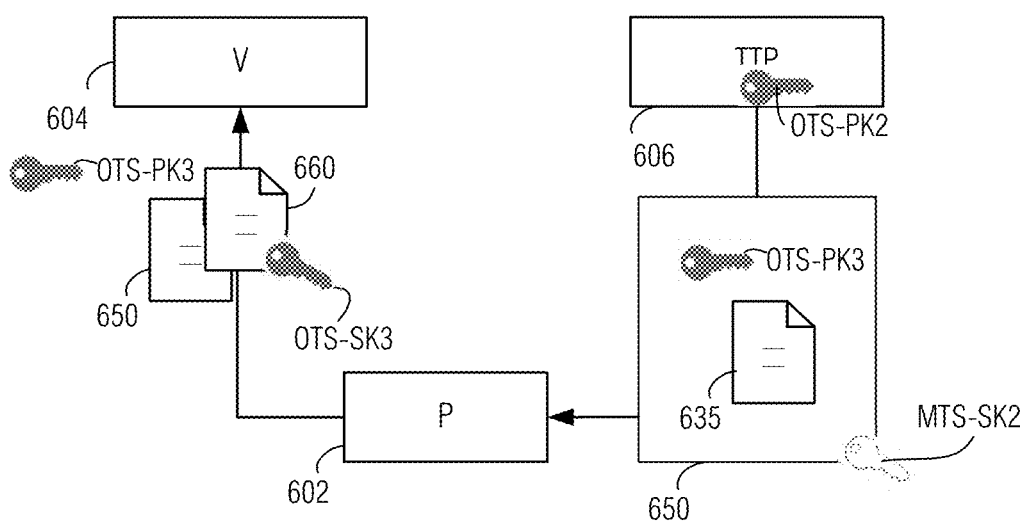

FIGS. 6A-6C are simplified information flow diagrams illustrating principal information exchanged during the stages of a three-party remote-attestation scenario involving P 602, V 604, and TTP 606 according to some embodiments.

A detailed description of a more complete protocol follows the simplified high-level example. In the description that follows, the various cryptographic keys are named according to a convention in which an indicator of key usage type (e.g., multi-time, one-time, few-time), followed by an indicator of whether the key is a public key or private key, followed by a numerical indicator of the unique key. In the key-naming convention, multi-time keys are named with the prefix "MTS," one-time use keys are named "OTS," and few-time keys are named "FTS." The indicator of either private vs. public key contains either "-PK" for public key, whereas a private key is indicated as "-SK". The OFTS signature key pair may be a one-time signature (OTS) type of key pair, or a few-time signature (FTS) type of key pair. For the sake of brevity, in the example embodiments detailed below, the use of OTS keys are described, with a subsequent discussion of variations to those embodiments to enable the use of FTS keys.

FIG. 6A illustrates trust relationships that are initially established. V 604 and TTP 606 establish a trust relationship 610. Trust relationship 610 may be based on two pairs of multi-time hash-based signature (HBS) keys, private keys MTS-SK1 and MTS-SK2, and public keys MTS-PK1 and MTS-PK2, according to an example embodiment. P 602 and TTP 606 also have a trust relationship, 620. Trust relationship 620 may be based on a hash-based one-time signature key pair, OTS-PK1 and OTS-SK1.

FIG. 6B illustrates an attestation request originated by V 604 to P 602 and the response by P 602 to that request. V 604 generates and digitally signs request 630 to be interpreted by P 602 as a request to provide attestation. Attestation request 630 may include identifiers of V 604, TTP 606, and P 602 among other items of information. Notably, the identifiers may include nicknames or other labels in lieu of unique IDs, which also may be used. Thus, the real identity of P may or may not be part of the attestation exchange. The request is signed by multi-time private key (MTS-SK1). In response, P 602 generates two OTS key pairs (private key OTS-SK2/public key OTS-PK2, and private key OTS-SK3/public key OTS-PK3). P 602 signs attestation request 630 and the two one-time public-keys (OTS-PK2, OTS-PK3) using the one-time private-key OTS-SK1, to produce validation request 640, and sends this to TTP 606. P 602 deletes OTS-PK2 and updates OTS-SK1 to OTS-SK2 for use in further operations.

FIG. 6C illustrates the validation response 650 of TTP 606 to validation request 640. TTP 606 verifies both signatures, the one-time signature OTS-SK1 from P 602, and the multi-time signature MTS-SK1 from V 604 using OTS-PK1 and MTS-PK1, respectively. If verification passes, TTP 606 updates (replaces) the previous one-time public key OTS-PK1 with OTS-PK2. TTP 606 signs at least a portion 635 of the data from attestation request 630, along with one-time public key OTS-PK3 using a multi-time private key MTS-SK2 to create validation response message 650, and sends it to P 602.

P 602 signs attestation data 660 (e.g., firmware, software, model number, etc.) using one-time key OTS-SK3, deletes the previous one-time keys (OTS-SK3, OTS-PK3) and sends signed attestation data 660, along with validation response 650, and ephemeral one-time public key OTS-PK3, to V 604.

V 604 verifies the signature of TTP 606 with MTS-PK2 and uses the ephemeral one-time public key OTS-PK3, which was previously generated by P 602 and validated by TTP 606 (as reflected in validation response 650), to verify the attestation.

Figure 7:
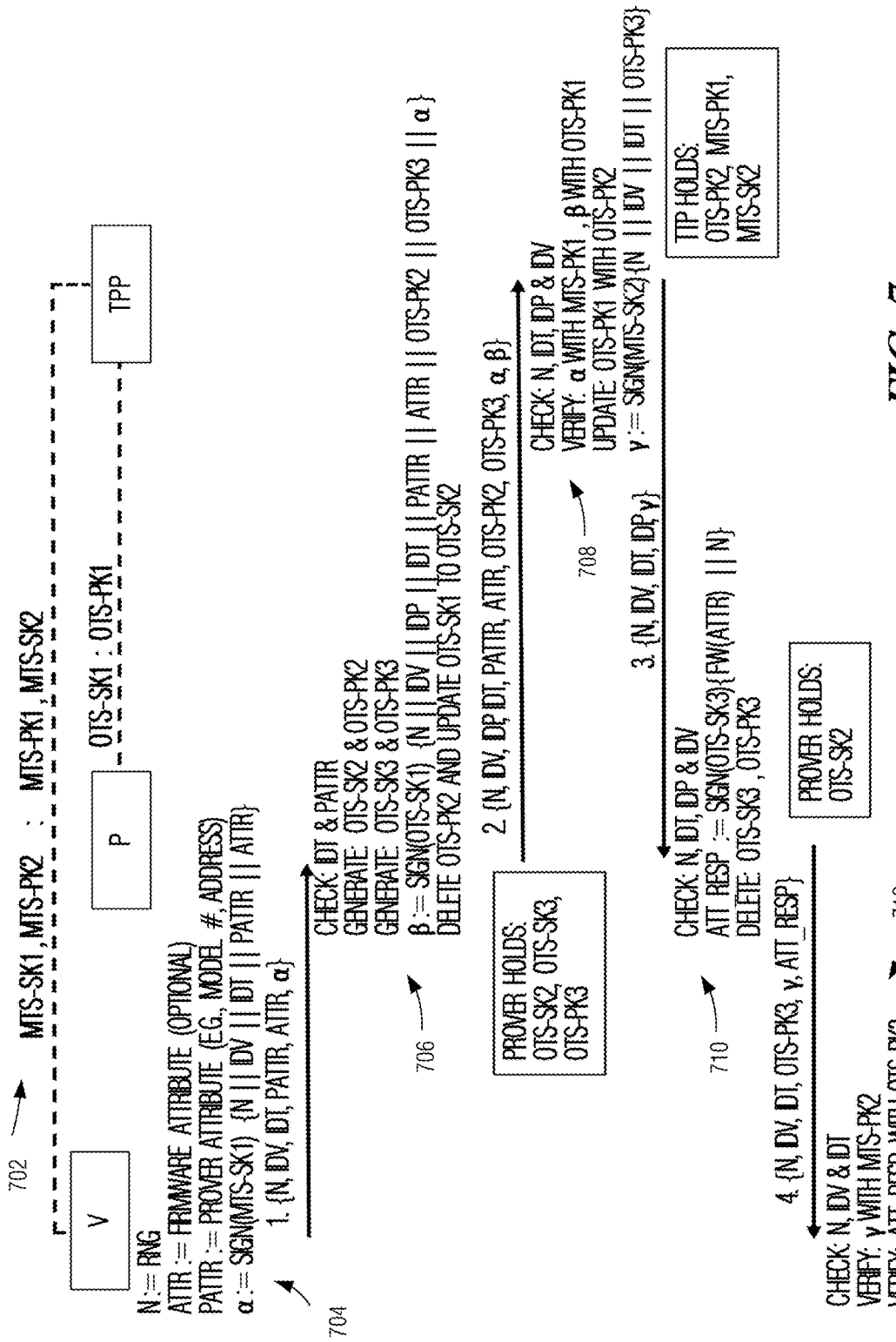
FIG. 7 is a detailed flow diagram illustrating operations performed and messages sent between participating entities of a three-party remote-attestation protocol according to an embodiment.

FIG. 7 is a detailed flow diagram illustrating operations performed and messages sent by each of P, V and TTP according to an embodiment Table 1 below provides a summary of some of the abbreviations and named parameters appearing in FIG. 7 and in the accompanying description that follows:

TABLE 1

Abbreviations and Parameters

| Symbol | Notation |
|---|---|
| N | Nonce |
| IDV, IDT, IDP, | Identifier |
| PATTR | Prover's attributes |
| ATTR | Attestation option (optional) |
| OTS-PK1, OTS-PK2, OTS-PK3 | One-time HBS public key |
| OTS-SK1, OTS-SK2, OTS-SK3 | One-time HBS private key |
| MTS-PK1, MTS-PK2 | Multi-time HBS public key |
| MTS-SK1, MTS-SK2 | Multi-time HBS private key |
| α, γ | Multi-time HBS signature |
| β | One-time HBS signature |
| ATT_RESP | One-time HBS signature |

The initial trust relationships, as described in the simplified example above, are indicated at 702. Key pairs MTS-SK1/MTS-PK1 and MTS-SK2/MTS-PK2 are two pairs of multi-time HBS keys shared between V and TTP. V holds the private key MTS-SK1 and the public key MTS-PK2, while TTP holds the private key MTS-SK2 and the public key MTS-PK1. OTS-SK1/OTS-PK1 are a pair of one-time HBS keys shared between P and TTP. P holds the private key OTS-SK1 and TTP holds the corresponding public key OTS-PK1. Notably, there is no initial trust relationship between V and P.

Operations performed by each of P, V, and TTP are listed vertically below the corresponding entity. Operations 704 and 712 are performed by V; operations 706 and 710 are performed by P; and operations 708 are performed by TTP. Transmitted messages are marked 1-4 and depicted by the arrows.

Message 1 is an attestation request sent from V to P as a result of operations 704. V first generates fresh nonce N using a random number generation operation RNG to prevent replay attack and uniquely identify this new protocol session. V determines the firmware image to be attested by setting proper ATTR. To bind this attestation request to the intended P, V includes its knowledge of, PATTR, in Message 1. To guarantee the integrity of Message 1 and prevent message modification, V computes the signature α on all the previous components using a multi-time HBS private key MTS-SK1 and attaches it to Message 1. Another purpose of the multi-time HBS signature is to protect against spoofing attack by proving V's identity at TTP when P validates this attestation request with TTP.

Message 2, is a validation request from P to TTP sent in response to the receipt of Message 1 by P as a result of operations 706. As P and V do not necessarily trust each other before execution of the protocol, P verifies the eligibility of V with TTP. Accordingly, P checks if it knows a TTP with IDT(IDP≠IDT, IDT≠IDV AND IDP≠IDV) and verifies if it matches PATTR.

If IDT and PATTR are correct, P temporarily accepts the attestation request and forwards the attestation request to TTP for further verification as part of Message 2. In this message, P indicates its own identifier to prevent misbinding attacks. P prepares two pairs of one-time HBS keys: OTS-PK2/OTS-SK2 and OTS-PK3/OTS-SK3. OTS-PK2/OTS- SK2 are used to replace OTS-PK1/OTS-SK1 as they will be consumed when signing Message 2. OTS-PK3/OTS-SK3 will be used to protect the integrity of the attestation response in Message 4.

P computes one-time HBS signature β with one-time HBS private key OTS-SK1 to protect the integrity of Message 2 as well as to prove its identity to TTP. Hence, β is used to prevent message modification and spoofing attacks. P generates Message 2 as illustrated in FIG. 7 and sends it to TTP. P deletes its local copy of OTS-PK2 and updates OTS-SK1 to OTS-SK2.

Message 3, is the validation response from TTP to P. After receiving P's validation request, TTP verifies the information presented by P relating to V's attestation request and provides its validation assessment to P. In response to receiving Message 2, TTP conducts operations 708. Accordingly, TTP checks the nonce N with its local database. If TTP has never seen N before, it adds N to the local nonce database and continues to the following operations; otherwise, it informs P to reject the attestation request as it may be a replay attack. TTP also verifies if IDT is its own identifier as well as if IDV and IDP are correct (IDP≠IDT, IDT≠IDV and IDP≠IDV).

Thereafter, TTP checks whether the P identified by IDP has matching attributes indicated in PATTR. If the previous verifications passed, TTP determines if V, identified by IDV, has the attestation privilege relating to the firmware image associated with attribute ATTR on P, identified by PATTR and IDP. In the affirmative case, TTP verifies signature α with multi-time HBS public key MTS-PK1 and signature β with one-time HBS public key OTS-PK1. If the two signatures are correct, TTP updates its local copy of OTS-PK1 with OTS-PK2.

To prepare the validation response, TTP computes signature γ on (N∥idV∥idT∥OTS-PK3) with multi-time HBS private key MTS-SK2. Note that OTS-PK 3, which will be used by V to verify the attestation response from P, is protected by the multi-time signature and hence represents TTP's guarantee. TTP then generates Message 3 as indicated above and sends it to P.

Message 4, is the attestation response from P to V. If V's attestation request is valid according to TTP's assessment, P performs local attestation operations and send the result to V. Operations 710 are performed by P in response to receiving Message 3. Accordingly, P verifies if IDP is its own identifier and if N, IDV and IDT in Message 3 are the same as those in Message 1. If the identifiers and the nonce are correct, P at this point knows that the attestation request has been approved by TTP. Hence, P computes its attestation response, ATT_RESP, as one-time HBS signature on FW(ATTR) ∥ N, where FW(ATTR) is the firmware image identified by ATTR, with one-time HBS private key OTS-SK3.

P generates Message 4 as detailed in FIG. 7 and sends it to V. This message includes two signatures: multi-time HBS signature γ from TTP, which protects the important session information against modification attack, and one-time HBS signature ATT_RESP, which carries attestation results as well as to prevent spoofing attacks. P then deletes its local copy of OTS-SK3 and OTS-PK3.

Upon receiving Message 4, V performs operations 712 to verify the attestation provided by P. V first verifies if IDV is its own identifier and if N and IDT in Message 4 are the same as those in Message 1. V also verifies the signature γ with multi-time HBS public key MTS-PK2. If γ is correct, V uses one-time HBS public key OTS-PK3 to verify the attestation response ATT_RESP from P. The output of this protocol is the receipt of attestation response ATT_RESP at V.

Examples, as described herein, may include, or may operate on, logic or a number of components, circuits, modules, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

Figure 8:
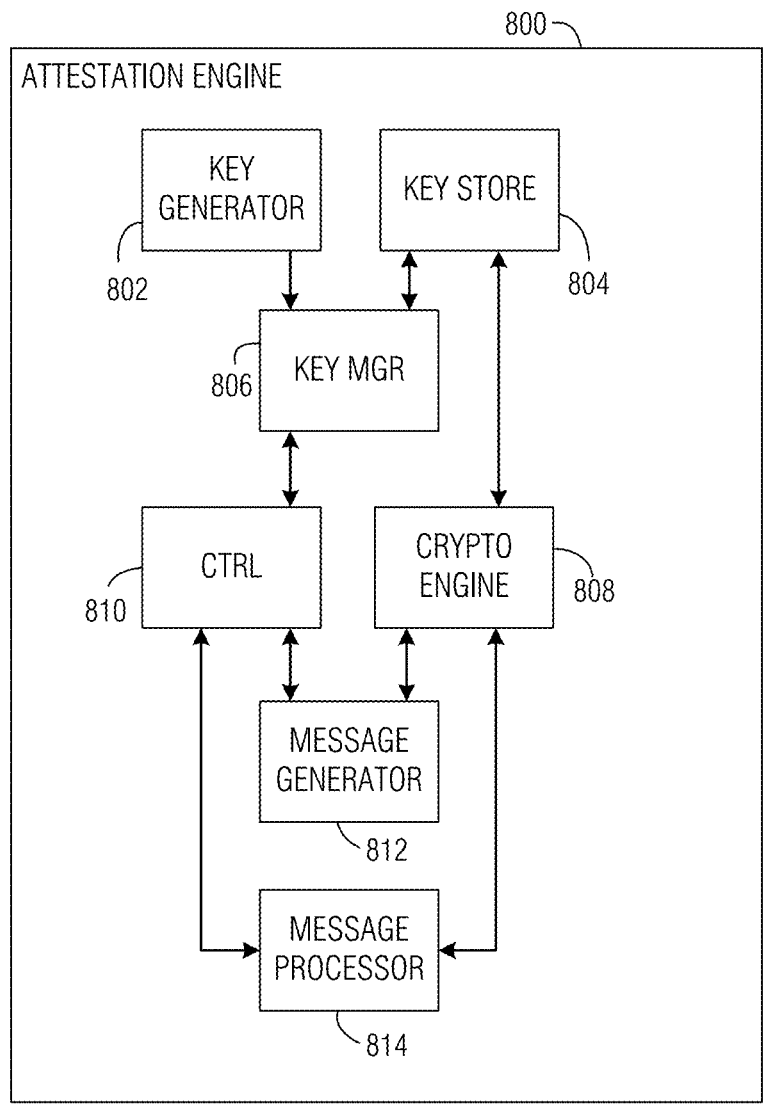
FIG. 8 is a system block diagram illustrating an example of an attestation engine which may be configured in a participating device according to embodiments described herein.

FIG. 8 is a system block diagram illustrating an example of an attestation engine 800, which may be configured in P, V, or TTP to varying implementations, to meet the corresponding device's functionality in accordance with protocols according to embodiments described herein. Attestation engine 800 utilizes a computing platform, such as any variant described above with reference to FIGS. 2-5, for example, to implement the operations described above with reference to FIGS. 6A-6C and FIG. 7. In the example depicted in FIG. 8, attestation engine 800 includes key generator 802, which is programmed, constructed, or otherwise configured, to generate keys for multi-time signature, one-time, or few-time signature operations. Key store 804 includes a volatile or non-volatile storage arrangement to store generated keys. Key manager 806 is programmed, constructed, or otherwise configured, to call for creation of new keys, and to update, expire, and delete used or old keys according to the applicable key-use policy. Cryptography engine 808 includes algorithms to compute digital signature operations using keys from key store 804. Controller 810 includes instructions for carrying out the attestation and verification operations described herein, and for coordinating the operation of the other components of attestation engine 800.

Message generator 812 is constructed, programmed, or otherwise configured, to generate messages for transmission to remote entities, such as message M1 in the case of V, messages M2 and M4 in the case of P, and message M3 in the case of TTP, under the control of controller 810. Message processor 814 is constructed, programmed, or otherwise configured, to parse incoming messages that are received in accordance with the attestation protocols according to embodiments described herein, and to pass their contents to controller 810.

With reference to the above example embodiments, according to a variation embodiment, few-time signature (FTS) keys are used in lieu of one or more of the OTS keys described above. According to this type of embodiment, P securely stores a counter (e.g., in key manager 806) to keep track of the number of signatures that were issued with each specific private FTS key. A limit is defined according to the FTS key arrangement. When the limit of secure signatures is reached (e.g., in the case of OTS this limit is 1, for FTS this limit is predefined as N), P updates the pre-shared keys by generating a new OTS or FTS key pair to replace the existing one shared between P and TTP. The protocol flow and messaging details are otherwise as described above for the OTS key embodiments.

In a related example, if no key update is due, P simply generates one OTS key pair for use between P and V. According to a variation of the above-described protocols, no FTS or OTS key pair is generated for use between P and TTP; however, one OTS key pair is generated for V. The new public key (e.g., the key for TTP) is removed from the plaintext part of Message 2 and from the signature computation of β. The counter is incremented in response to P verifying Message 3.

ADDITIONAL NOTES & EXAMPLES

Example 1 is a prover device to provide attestation to a verifier device, comprising: a computing platform including at least one processor core, data storage, and an attestation engine that, when executed, causes the computing hardware to: store a first cryptographic representation of a first trust relationship between the computing device and a trusted computing device, the first cryptographic representation being based on a one-or-few-times, hash-based, signature key; receive an attestation request from the verifier device, the attestation request including a second cryptographic representation of a second trust relationship between the verifier device and the trusted computing device; in response to the attestation request, send a validation request to the trusted computing device, the validation request being based on a cryptographic association of the first trust relationship with the second trust relationship; receive a validation response to the validation request, the validation response including a cryptographic representation of verification of validity of the first trust relationship and the second trust relationship; and send an attestation response to the verifier device in response to the validation response, the attestation response including the cryptographic representation of the verification of validity from the validation response, with attestation data describing the prover device.

In Example 2, the subject matter of Example 1 optionally includes wherein: the attestation request includes an instance identifier associated with the attestation request; the validation request is based on the instance identifier; and the validation response and attestation response are associated with the instance identifier.

In Example 3, the subject matter of Example 2 optionally includes wherein the instance identifier includes a nonce.

In Example 4, the subject matter of any one or more of Examples 2-3 optionally include wherein the instance identifier includes an identification of the verifier device.

In Example 5, the subject matter of any one or more of Examples 2-4 optionally include wherein the instance identifier includes an attribute of the prover device.

In Example 6, the subject matter of any one or more of Examples 1-5 optionally include wherein the validation request further includes a third representation of the first trust relationship and a fourth representation of the first trust relationship.

In Example 7, the subject matter of any one or more of Examples 1-6 optionally include wherein the one-or-few-times, hash-based, signature key is a few-times signature key encoded for not more than 10 uses.

In Example 8, the subject matter of any one or more of Examples 1-7 optionally include wherein the one-or-few-times, hash-based, signature key is a one-time signature key.

In Example 9, the subject matter of any one or more of Examples 1-8 optionally include wherein the second representation of the second trust relationship is based on a multi-time hash-based signature key, wherein the multi-time hash-based signature key is encoded for more than 10 uses.

In Example 10, the subject matter of any one or more of Examples 1-9 optionally include wherein the prover device lacks a trust relationship with the verifier device.

In Example 11, the subject matter of any one or more of Examples 1-10 optionally include wherein the attestation data includes a representation of hardware of the prover device.

In Example 12, the subject matter of any one or more of Examples 1-11 optionally include wherein the attestation data includes a representation of firmware of the prover device.

In Example 13, the subject matter of any one or more of Examples 1-12 optionally include wherein the attestation data includes a representation of software of the prover device.

In Example 14, the subject matter of any one or more of Examples 1-13 optionally include wherein the second cryptographic representation of the second trust relationship between the verifier device and the trusted computing device includes a pair of asymmetric hash-based multi-time cryptographic keys.

In Example 15, the subject matter of any one or more of Examples 1-14 optionally include wherein the cryptographic association of the first trust relationship with the second trust relationship of the validation request includes the second cryptographic representation of the second trust relationship digitally signed by the one-or-few-times, hash-based, signature key.

Example 16 is a verifier device to obtain attestation from a prover device, comprising: a computing platform including at least one processor core, data storage, and an attestation engine that, when executed, causes the computing hardware to: send an attestation request to the prover device, the attestation request including a cryptographic representation of a first trust relationship between the verifier device and the trusted computing device; and receive an attestation response from the prover device, the attestation response including attestation data describing the prover device and further including a cryptographic representation of a verification of validity of the first trust relationship, and validity of a second trust relationship between the prover device and the trusted computing device, the second trust relationship being cryptographically represented based on a one-or-few-times, hash-based, signature key pair.

In Example 17, the subject matter of Example 16 optionally includes wherein the attestation response is sent in response to a validation exchange between the prover device and the trusted computing device, wherein the validation exchange is based on a cryptographic association of the second trust relationship and produces the verification of validity of the first trust relationship and the second trust relationship.

In Example 18, the subject matter of any one or more of Examples 16-17 optionally include wherein: the attestation request includes an instance identifier associated with the attestation request; the validation request is based on the instance identifier; and the validation response and attestation response are associated with the instance identifier.

In Example 19, the subject matter of Example 18 optionally includes wherein the instance identifier includes a nonce.

In Example 20, the subject matter of any one or more of Examples 18-19 optionally include wherein the instance identifier includes an identification of the prover device.

In Example 21, the subject matter of any one or more of Examples 18-20 optionally include wherein the instance identifier includes an attribute of the prover device.

In Example 22, the subject matter of any one or more of Examples 16-21 optionally include wherein the one-or-few-times, hash-based, signature key is a few-times signature key encoded for not more than 10 uses.

In Example 23, the subject matter of any one or more of Examples 16-22 optionally include wherein the one-or-few-times, hash-based, signature key is a one-time signature key.

In Example 24, the subject matter of any one or more of Examples 16-23 optionally include wherein the second representation of the second trust relationship is based on a multi-time hash-based signature key, wherein the multi-time hash-based signature key is encoded for more than 10 uses.

In Example 25, the subject matter of any one or more of Examples 16-24 optionally include wherein The verifier device lacks a trust relationship with the prover device.

In Example 26, the subject matter of any one or more of Examples 16-25 optionally include wherein the attestation data includes a representation of hardware of the prover device.

In Example 27, the subject matter of any one or more of Examples 16-26 optionally include wherein the attestation data includes a representation of firmware of the prover device.

In Example 28, the subject matter of any one or more of Examples 16-27 optionally include wherein the attestation data includes a representation of software of the prover device.

In Example 29, the subject matter of any one or more of Examples 16-28 optionally include wherein the first cryptographic representation of the first trust relationship between the verifier device and the trusted computing device includes a pair of asymmetric hash-based multi-time cryptographic keys.

In Example 30, the subject matter of any one or more of Examples 16-29 optionally include wherein the cryptographic association of the first trust relationship with the second trust relationship includes the first cryptographic representation of the first trust relationship digitally signed by the one-or-few-times, hash-based, signature key.

Example 31 is a trusted device to provide verification of trust relationships in a device-attestation protocol, the trusted device comprising a computing platform including at least one processor core, data storage, and an attestation engine that, when executed, causes the computing hardware to: store a first cryptographic representation of a first trust relationship between the trusted device and a prover device, the first cryptographic representation being based on a one-or-few-times, hash-based, signature key; receive a validation request from the prover device, the validation request being based on a cryptographic association of the first trust relationship with a second trust relationship, the second trust relationship being between the trusted device and a verifier device, and represented by a second cryptographic representation; perform a verification of validity of the first trust relationship and the second trust relationship; and in response to a positive result of the verification of validity, send a validation response to the prover device, the validation response including a cryptographic representation of the positive result.

In Example 32, the subject matter of Example 31 optionally includes wherein the validation request further includes a third representation of the first trust relationship and a fourth representation of the first trust relationship.

In Example 33, the subject matter of any one or more of Examples 31-32 optionally include wherein the one-or-few-times, hash-based, signature key is a few-times signature key encoded for not more than 10 uses.

In Example 34, the subject matter of any one or more of Examples 31-33 optionally include wherein the one-or-few-times, hash-based, signature key is a one-time signature key.

In Example 35, the subject matter of any one or more of Examples 31-34 optionally include wherein the second representation of the second trust relationship is based on a multi-time hash-based signature key, wherein the multi-time hash-based signature key is encoded for more than 10 uses.

In Example 36, the subject matter of any one or more of Examples 31-35 optionally include wherein the second cryptographic representation of the second trust relationship between the verifier device and the trusted computing device includes a pair of asymmetric hash-based multi-time cryptographic keys.

In Example 37, the subject matter of any one or more of Examples 31-36 optionally include wherein the cryptographic association of the first trust relationship with the second trust relationship of the validation request includes the second cryptographic representation of the second trust relationship digitally signed by the one-or-few-times, hash-based, signature key.

Example 38 is a method to provide attestation to a verifier device, the method being executed by a computing platform of a prover device, and comprising storing a first cryptographic representation of a first trust relationship between the computing device and a trusted computing device, the first cryptographic representation being based on a one-or-few-times, hash-based, signature key; receiving an attestation request from the verifier device, the attestation request including a second cryptographic representation of a second trust relationship between the verifier device and the trusted computing device; in response to the attestation request, sending a validation request to the trusted computing device, the validation request being based on a cryptographic association of the first trust relationship with the second trust relationship; receiving a validation response to the validation request, the validation response including a cryptographic representation of verification of validity of the first trust relationship and the second trust relationship; and sending an attestation response to the verifier device in response to the validation response, the attestation response including the cryptographic representation of the verification of validity from the validation response, with attestation data describing the prover device.

In Example 39, the subject matter of Example 38 optionally includes wherein: the attestation request includes an instance identifier associated with the attestation request; the validation request is based on the instance identifier; and the validation response and attestation response are associated with the instance identifier.

In Example 40, the subject matter of Example 39 optionally includes wherein the instance identifier includes a nonce.

In Example 41, the subject matter of any one or more of Examples 39-40 optionally include wherein the instance identifier includes an identification of the verifier device.

In Example 42, the subject matter of any one or more of Examples 39-41 optionally include wherein the instance identifier includes an attribute of the prover device.

In Example 43, the subject matter of any one or more of Examples 38-42 optionally include wherein the validation request further includes a third representation of the first trust relationship and a fourth representation of the first trust relationship.

In Example 44, the subject matter of any one or more of Examples 38-43 optionally include wherein the one-or-few-times, hash-based, signature key is a few-times signature key encoded for not more than 10 uses.

In Example 45, the subject matter of any one or more of Examples 38-44 optionally include wherein the one-or-few-times, hash-based, signature key is a one-time signature key.

In Example 46, the subject matter of any one or more of Examples 38-45 optionally include wherein the second representation of the second trust relationship is based on a multi-time hash-based signature key, wherein the multi-time hash-based signature key is encoded for more than 10 uses.

In Example 47, the subject matter of any one or more of Examples 38-46 optionally include wherein the prover device lacks a trust relationship with the verifier device.

In Example 48, the subject matter of any one or more of Examples 38-47 optionally include wherein the attestation data includes a representation of hardware of the prover device.

In Example 49, the subject matter of any one or more of Examples 38-48 optionally include wherein the attestation data includes a representation of firmware of the prover device.

In Example 50, the subject matter of any one or more of Examples 38-49 optionally include wherein the attestation data includes a representation of software of the prover device.

In Example 51, the subject matter of any one or more of Examples 38-50 optionally include wherein the second cryptographic representation of the second trust relationship between the verifier device and the trusted computing device includes a pair of asymmetric hash-based multi-time cryptographic keys.

In Example 52, the subject matter of any one or more of Examples 38-51 optionally include wherein the cryptographic association of the first trust relationship with the second trust relationship of the validation request includes the second cryptographic representation of the second trust relationship digitally signed by the one-or-few-times, hash-based, signature key.

Example 53 is a method to obtain attestation from a prover device, the method being executed by a computing platform of a verifier device, and comprising sending an attestation request to the prover device, the attestation request including a cryptographic representation of a first trust relationship between the verifier device and the trusted computing device; and receiving an attestation response from the prover device, the attestation response including attestation data describing the prover device and further including a cryptographic representation of a verification of validity of the first trust relationship, and validity of a second trust relationship between the prover device and the trusted computing device, the second trust relationship being cryptographically represented based on a one-or-few-times, hash-based, signature key pair.

In Example 54, the subject matter of Example 53 optionally includes wherein the attestation response is sent in response to a validation exchange between the prover device and the trusted computing device, wherein the validation exchange is based on a cryptographic association of the second trust relationship and produces the verification of validity of the first trust relationship and the second trust relationship.

In Example 55, the subject matter of any one or more of Examples 53-54 optionally include wherein: the attestation request includes an instance identifier associated with the attestation request; the validation request is based on the instance identifier; and the validation response and attestation response are associated with the instance identifier.

In Example 56, the subject matter of Example 55 optionally includes wherein the instance identifier includes a nonce.

In Example 57, the subject matter of any one or more of Examples 55-56 optionally include wherein the instance identifier includes an identification of the prover device.

In Example 58, the subject matter of any one or more of Examples 55-57 optionally include wherein the instance identifier includes an attribute of the prover device.

In Example 59, the subject matter of any one or more of Examples 53-58 optionally include wherein the one-or-few-times, hash-based, signature key is a few-times signature key encoded for not more than 10 uses.

In Example 60, the subject matter of any one or more of Examples 53-59 optionally include wherein the one-or-few-times, hash-based, signature key is a one-time signature key.

In Example 61, the subject matter of any one or more of Examples 53-60 optionally include wherein the second representation of the second trust relationship is based on a multi-time hash-based signature key, wherein the multi-time hash-based signature key is encoded for more than 10 uses.

In Example 62, the subject matter of any one or more of Examples 53-61 optionally include wherein the verifier device lacks a trust relationship with the prover device.

In Example 63, the subject matter of any one or more of Examples 53-62 optionally include wherein the attestation data includes a representation of hardware of the prover device.

In Example 64, the subject matter of any one or more of Examples 53-63 optionally include wherein the attestation data includes a representation of firmware of the prover device.

In Example 65, the subject matter of any one or more of Examples 53-64 optionally include wherein the attestation data includes a representation of software of the prover device.

In Example 66, the subject matter of any one or more of Examples 53-65 optionally include wherein the first cryptographic representation of the first trust relationship between the verifier device and the trusted computing device includes a pair of asymmetric hash-based multi-time cryptographic keys.

In Example 67, the subject matter of any one or more of Examples 53-66 optionally include wherein the cryptographic association of the first trust relationship with the second trust relationship includes the first cryptographic representation of the first trust relationship digitally signed by the one-or-few-times, hash-based, signature key.

Example 68 is a method to provide verification of trust relationships in a device-attestation protocol, the method being executed by a trusted device, and comprising: storing a first cryptographic representation of a first trust relationship between the trusted device and a prover device, the first cryptographic representation being based on a one-or-few-times, hash-based, signature key; receiving a validation request from the prover device, the validation request being based on a cryptographic association of the first trust relationship with a second trust relationship, the second trust relationship being between the trusted device and a verifier device, and represented by a second cryptographic representation; performing a verification of validity of the first trust relationship and the second trust relationship; and in response to a positive result of the verification of validity, sending a validation response to the prover device, the validation response including a cryptographic representation of the positive result.

In Example 69, the subject matter of Example 68 optionally includes wherein the validation request further includes a third representation of the first trust relationship and a fourth representation of the first trust relationship.

In Example 70, the subject matter of any one or more of Examples 68-69 optionally include wherein the one-or-few-times, hash-based, signature key is a few-times signature key encoded for not more than 10 uses.

In Example 71, the subject matter of any one or more of Examples 68-70 optionally include wherein the one-or-few-times, hash-based, signature key is a one-time signature key.

In Example 72, the subject matter of any one or more of Examples 68-71 optionally include wherein the second representation of the second trust relationship is based on a multi-time hash-based signature key, wherein the multi-time hash-based signature key is encoded for more than 10 uses.

In Example 73, the subject matter of any one or more of Examples 68-72 optionally include wherein the second cryptographic representation of the second trust relationship between the verifier device and the trusted computing device includes a pair of asymmetric hash-based multi-time cryptographic keys.

In Example 74, the subject matter of any one or more of Examples 68-73 optionally include wherein the cryptographic association of the first trust relationship with the second trust relationship of the validation request includes the second cryptographic representation of the second trust relationship digitally signed by the one-or-few-times, hash-based, signature key.

Example 75 is at least one machine-readable medium containing instructions that, when executed on a computing platform, cause the computing platform to execute a method according to any one of Examples 38-74.

Example 76 is a system for facilitating attestation between computing devices, the system comprising means for carrying out a method according to any one of Examples 38-74.

Example 77 is at least one machine-readable medium comprising instructions that, when executed on a computing platform of a prover device, cause the computing platform to perform operations including storing a first cryptographic representation of a first trust relationship between the computing device and a trusted computing device, the first cryptographic representation being based on a one-or-few-times, hash-based, signature key; receiving an attestation request from the verifier device, the attestation request including a second cryptographic representation of a second trust relationship between the verifier device and the trusted computing device; in response to the attestation request, sending a validation request to the trusted computing device, the validation request being based on a cryptographic association of the first trust relationship with the second trust relationship; receiving a validation response to the validation request, the validation response including a cryptographic representation of verification of validity of the first trust relationship and the second trust relationship; and sending an attestation response to the verifier device in response to the validation response, the attestation response including the cryptographic representation of the verification of validity from the validation response, with attestation data describing the prover device.

In Example 78, the subject matter of Example 77 optionally includes wherein: the attestation request includes an instance identifier associated with the attestation request; the validation request is based on the instance identifier; and the validation response and attestation response are associated with the instance identifier.

In Example 79, the subject matter of Example 78 optionally includes wherein the instance identifier includes a nonce.

In Example 80, the subject matter of any one or more of Examples 78-79 optionally include wherein the instance identifier includes an identification of the verifier device.

In Example 81, the subject matter of any one or more of Examples 78-80 optionally include wherein the instance identifier includes an attribute of the prover device.

In Example 82, the subject matter of any one or more of Examples 77-81 optionally include wherein the validation request further includes a third representation of the first trust relationship and a fourth representation of the first trust relationship.

In Example 83, the subject matter of any one or more of Examples 77-82 optionally include wherein the one-or-few-times, hash-based, signature key is a few-times signature key encoded for not more than 10 uses.

In Example 84, the subject matter of any one or more of Examples 77-83 optionally include wherein the one-or-few-times, hash-based, signature key is a one-time signature key.

In Example 85, the subject matter of any one or more of Examples 77-84 optionally include wherein the second representation of the second trust relationship is based on a multi-time hash-based signature key, wherein the multi-time hash-based signature key is encoded for more than 10 uses.

In Example 86, the subject matter of any one or more of Examples 77-85 optionally include wherein the prover device lacks a trust relationship with the verifier device.

In Example 87, the subject matter of any one or more of Examples 77-86 optionally include wherein the attestation data includes a representation of hardware of the prover device.

In Example 88, the subject matter of any one or more of Examples 77-87 optionally include wherein the attestation data includes a representation of firmware of the prover device.

In Example 89, the subject matter of any one or more of Examples 77-88 optionally include wherein the attestation data includes a representation of software of the prover device.

In Example 90, the subject matter of any one or more of Examples 77-89 optionally include wherein the second cryptographic representation of the second trust relationship between the verifier device and the trusted computing device includes a pair of asymmetric hash-based multi-time cryptographic keys.

In Example 91, the subject matter of any one or more of Examples 77-90 optionally include wherein the cryptographic association of the first trust relationship with the second trust relationship of the validation request includes the second cryptographic representation of the second trust relationship digitally signed by the one-or-few-times, hash-based, signature key.

Example 92 is at least one machine-readable medium comprising instructions that, when executed on a computing platform of a verifier device, cause the computing platform to perform operations including sending an attestation request to the prover device, the attestation request including a cryptographic representation of a first trust relationship between the verifier device and the trusted computing device; and receiving an attestation response from the prover device, the attestation response including attestation data describing the prover device and further including a cryptographic representation of a verification of validity of the first trust relationship, and validity of a second trust relationship between the prover device and the trusted computing device, the second trust relationship being cryptographically represented based on a one-or-few-times, hash-based, signature key pair.

In Example 93, the subject matter of Example 92 optionally includes wherein the attestation response is sent in response to a validation exchange between the prover device and the trusted computing device, wherein the validation exchange is based on a cryptographic association of the second trust relationship and produces the verification of validity of the first trust relationship and the second trust relationship.

In Example 94, the subject matter of any one or more of Examples 92-93 optionally include wherein: the attestation request includes an instance identifier associated with the attestation request; the validation request is based on the instance identifier; and the validation response and attestation response are associated with the instance identifier.

In Example 95, the subject matter of Example 94 optionally includes wherein the instance identifier includes a nonce.

In Example 96, the subject matter of any one or more of Examples 94-95 optionally include wherein the instance identifier includes an identification of the prover device.

In Example 97, the subject matter of any one or more of Examples 94-96 optionally include wherein the instance identifier includes an attribute of the prover device.

In Example 98, the subject matter of any one or more of Examples 92-97 optionally include wherein the one-or-few-times, hash-based, signature key is a few-times signature key encoded for not more than 10 uses.

In Example 99, the subject ratter of any one or more of Examples 92-98 optionally include wherein the one-or-few-times, hash-based, signature key is a one-time signature key.

In Example 100, the subject matter of any one or more of Examples 92-99 optionally include wherein the second representation of the second trust relationship is based on a multi-time hash-based signature key, wherein the multi-time hash-based signature key is encoded for more than 10 uses.

In Example 101, the subject matter of any one or more of Examples 92-100 optionally include wherein the verifier device lacks a trust relationship with the prover device.

In Example 102, the subject matter of any one or more of Examples 92-101 optionally include wherein the attestation data includes a representation of hardware of the prover device.

In Example 103, the subject matter of any one or more of Examples 92-102 optionally include wherein the attestation data includes a representation of firmware of the prover device.

In Example 104, the subject matter of any one or more of Examples 92-103 optionally include wherein the attestation data includes a representation of software of the prover device.

In Example 105, the subject matter of any one or more of Examples 92-104 optionally include wherein the first cryptographic representation of the first trust relationship between the verifier device and the trusted computing device includes a pair of asymmetric hash-based multi-time cryptographic keys.

In Example 106, the subject matter of any one or more of Examples 92-105 optionally include wherein the cryptographic association of the first trust relationship with the second trust relationship includes the first cryptographic representation of the first trust relationship digitally signed by the one-or-few-times, hash-based, signature key.

Example 107 is at least one machine-readable medium comprising instructions that, when executed on a computing platform of a trusted device, cause the computing platform to perform operations including storing a first cryptographic representation of a first trust relationship between the trusted device and a prover device, the first cryptographic representation being based on a one-or-few-times, hash-based, signature key; receiving a validation request from the prover device, the validation request being based on a cryptographic association of the first trust relationship with a second trust relationship, the second trust relationship being between the trusted device and a verifier device, and represented by a second cryptographic representation; performing a verification of validity of the first trust relationship and the second trust relationship; and in response to a positive result of the verification of validity, sending a validation response to the prover device, the validation response including a cryptographic representation of the positive result.

In Example 108, the subject matter of Example 107 optionally includes wherein the validation request further includes a third representation of the first trust relationship and a fourth representation of the first trust relationship.

In Example 109, the subject matter of any one or more of Examples 107-108 optionally include wherein the one-or-few-times, hash-based, signature key is a few-times signature key encoded for not more than 10 uses.

In Example 110, the subject matter of any one or more of Examples 107-109 optionally include wherein the one-or-few-times, hash-based, signature key is a one-time signature key.

In Example 111, the subject matter of any one or more of Examples 107-110 optionally include wherein the second representation of the second trust relationship is based on a multi-time hash-based signature key, wherein the multi-time hash-based signature key is encoded for more than 10 uses.

In Example 112, the subject matter of any one or more of Examples 107-111 optionally include wherein the second cryptographic representation of the second trust relationship between the verifier device and the trusted computing device includes a pair of asymmetric hash-based multi-time cryptographic keys.

In Example 113, the subject matter of any one or more of Examples 107-112 optionally include wherein the cryptographic association of the first trust relationship with the second trust relationship of the validation request includes the second cryptographic representation of the second trust relationship digitally signed by the one-or-few-times, hash-based, signature key.

Example 114 is a system to provide attestation to a verifier device, the system comprising: means for storing a first cryptographic representation of a first trust relationship between the computing device and a trusted computing device, the first cryptographic representation being based on a one-or-few-times, hash-based, signature key; means for receiving an attestation request from the verifier device, the attestation request including a second cryptographic representation of a second trust relationship between the verifier device and the trusted computing device; means for sending a validation request to the trusted computing device in response to the attestation request, the validation request being based on a cryptographic association of the first trust relationship with the second trust relationship; means for receiving a validation response to the validation request, the validation response including a cryptographic representation of verification of validity of the first trust relationship and the second trust relationship; and means for sending an attestation response to the verifier device in response to the validation response, the attestation response including the cryptographic representation of the verification of validity from the validation response, with attestation data describing the prover device.

In Example 115, the subject matter of Example 114 optionally includes wherein: the attestation request includes an instance identifier associated with the attestation request; the validation request is based on the instance identifier; and the validation response and attestation response are associated with the instance identifier.

In Example 116, the subject matter of Example 115 optionally includes wherein the instance identifier includes a nonce.

In Example 117, the subject matter of any one or more of Examples 115-116 optionally include wherein the instance identifier includes an identification of the verifier device.

In Example 118, the subject matter of any one or more of Examples 115-117 optionally include wherein the instance identifier includes an attribute of the prover device.

In Example 119, the subject matter of any one or more of Examples 114-118 optionally include wherein the validation request further includes a third representation of the first trust relationship and a fourth representation of the first trust relationship.

In Example 120, the subject matter of any one or more of Examples 114-119 optionally include wherein the one-or-few-times, hash-based, signature key is a few-times signature key encoded for not more than 10 uses.

In Example 121, the subject matter of any one or more of Examples 114-120 optionally include wherein the one-or-few-times, hash-based, signature key is a one-time signature key.

In Example 122, the subject matter of any one or more of Examples 114-121 optionally include wherein the second representation of the second trust relationship is based on a multi-time hash-based signature key, wherein the multi-time hash-based signature key is encoded for more than 10 uses.

In Example 123, the subject matter of any one or more of Examples 114-122 optionally include wherein the prover device lacks a trust relationship with the verifier device.

In Example 124, the subject matter of any one or more of Examples 114-123 optionally include wherein the attestation data includes a representation of hardware of the prover device.

In Example 125, the subject matter of any one or more of Examples 114-124 optionally include wherein the attestation data includes a representation of firmware of the prover device.

In Example 126, the subject matter of any one or more of Examples 114-125 optionally include wherein the attestation data includes a representation of software of the prover device.

In Example 127, the subject matter of any one or more of Examples 114-126 optionally include wherein the second cryptographic representation of the second trust relationship between the verifier device and the trusted computing device includes a pair of asymmetric hash-based multi-time cryptographic keys.

In Example 128, the subject matter of any one or more of Examples 114-127 optionally include wherein the cryptographic association of the first trust relationship with the second trust relationship of the validation request includes the second cryptographic representation of the second trust relationship digitally signed by the one-or-few-times, hash-based, signature key.

Example 129 is a system to obtain attestation from a prover device, the system comprising: means for sending an attestation request to the prover device, the attestation request including a cryptographic representation of a first trust relationship between the verifier device and the trusted computing device; and means for receiving an attestation response from the prover device, the attestation response including attestation data describing the prover device and further including a cryptographic representation of a verification of validity of the first trust relationship, and validity of a second trust relationship between the prover device and the trusted computing device, the second trust relationship being cryptographically represented based on a one-or-few-times, hash-based, signature key pair.

In Example 130, the subject matter of Example 129 optionally includes wherein the attestation response is sent in response to a validation exchange between the prover device and the trusted computing device, wherein the validation exchange is based on a cryptographic association of the second trust relationship and produces the verification of validity of the first trust relationship and the second trust relationship.

In Example 131, the subject matter of any one or more of Examples 129-130 optionally include wherein: the attestation request includes an instance identifier associated with the attestation request; the validation request is based on the instance identifier; and the validation response and attestation response are associated with the instance identifier.

In Example 132, the subject matter of Example 131 optionally includes wherein the instance identifier includes a nonce.

In Example 133, the subject matter of any one or more of Examples 131-132 optionally include wherein the instance identifier includes an identification of the prover device.

In Example 134, the subject matter of any one or more of Examples 131-133 optionally include wherein the instance identifier includes an attribute of the prover device.

In Example 135, the subject matter of any one or more of Examples 129-134 optionally include wherein the one-or-few-times, hash-based, signature key is a few-times signature key encoded for not more than 10 uses.

In Example 136, the subject matter of any one or more of Examples 129-135 optionally include wherein the one-or-few-times, hash-based, signature key is a one-time signature key.

In Example 137, the subject matter of any one or more of Examples 129-136 optionally include wherein the second representation of the second trust relationship is based on a multi-time hash-based signature key, wherein the multi-time hash-based signature key is encoded for more than 10 uses.

In Example 138, the subject matter of any one or more of Examples 129-137 optionally include wherein the verifier device lacks a trust relationship with the prover device.

In Example 139, the subject matter of any one or more of Examples 129-138 optionally include wherein the attestation data includes a representation of hardware of the prover device.

In Example 140, the subject matter of any one or more of Examples 129-139 optionally include wherein the attestation data includes a representation of firmware of the prover device.

In Example 141, the subject matter of any one or more of Examples 129-140 optionally include wherein the attestation data includes a representation of software of the prover device.

In Example 142, the subject matter of any one or more of Examples 129-141 optionally include wherein the first cryptographic representation of the first trust relationship between the verifier device and the trusted computing device includes a pair of asymmetric hash-based multi-time cryptographic keys.

In Example 143, the subject matter of any one or more of Examples 129-142 optionally include wherein the cryptographic association of the first trust relationship with the second trust relationship includes the first cryptographic representation of the first trust relationship digitally signed by the one-or-few-times, hash-based, signature key.

Example 144 is a system to provide verification of trust relationships in a device-attestation protocol, the system comprising: means for storing a first cryptographic representation of a first trust relationship between the trusted device and a prover device, the first cryptographic representation being based on a one-or-few-times, hash-based, signature key; means for receiving a validation request from the prover device, the validation request being based on a cryptographic association of the first trust relationship with a second trust relationship, the second trust relationship being between the trusted device and a verifier device, and represented by a second cryptographic representation; means for performing a verification of validity of the first trust relationship and the second trust relationship; and means for sending a validation response to the prover device in response to a positive result of the verification of validity, the validation response including a cryptographic representation of the positive result.

In Example 145, the subject matter of Example 144 optionally includes wherein the validation request further includes a third representation of the first trust relationship and a fourth representation of the first trust relationship.

In Example 146, the subject matter of any one or more of Examples 144-145 optionally include wherein the one-or-few-times, hash-based, signature key is a few-times signature key encoded for not more than 10 uses.

In Example 147, the subject matter of any one or more of Examples 144-146 optionally include wherein the one-or-few-times, hash-based, signature key is a one-time signature key.

In Example 148, the subject matter of any one or more of Examples 144-147 optionally include wherein the second representation of the second trust relationship is based on a multi-time hash-based signature key, wherein the multi-time hash-based signature key is encoded for more than 10 uses.

In Example 149, the subject matter of any one or more of Examples 144-148 optionally include wherein the second cryptographic representation of the second trust relationship between the verifier device and the trusted computing device includes a pair of asymmetric hash-based multi-time cryptographic keys.

In Example 150, the subject matter of any one or more of Examples 144-149 optionally include wherein the cryptographic association of the first trust relationship with the second trust relationship of the validation request includes the second cryptographic representation of the second trust relationship digitally signed by the one-or-few-times, hash-based, signature key.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A prover device to provide attestation to a verifier device, comprising:
    a computing platform including at least one processor core, data storage, and an attestation engine that, when executed, causes the computing platform to:
        store a first cryptographic representation of a first trust relationship between the computing platform and a trusted computing device, the first cryptographic representation being based on a one-or-few-times, hash-based, signature key;
        receive an attestation request from the verifier device, the attestation request including a second cryptographic representation of a second trust relationship between the verifier device and the trusted computing device;
        in response to the attestation request, send a validation request to the trusted computing device, the validation request being based on a cryptographic association of the first trust relationship with the second trust relationship;
        receive a validation response to the validation request, the validation response including a cryptographic representation of verification of validity of the first trust relationship and the second trust relationship; and
        send an attestation response to the verifier device in response to the validation response, the attestation response including the cryptographic representation of the verification of validity from the validation response, with attestation data describing the prover device,
        wherein the prover device lacks a trust relationship with the verifier device.

2. The prover device of claim 1, wherein:
    the attestation request includes an instance identifier associated with the attestation request;
    the validation request is based on the instance identifier; and
    the validation response and attestation response are associated with the instance identifier.

3. The prover device of claim 2, wherein the instance identifier includes a nonce.

4. The prover device of claim 2, wherein the instance identifier includes an identification of the verifier device.

5. The prover device of claim 2, wherein the instance identifier includes an attribute of the prover device.

6. The prover device of claim 1, wherein the validation request further includes a third representation of the first trust relationship and a fourth representation of the first trust relationship.

7. The prover device of claim 1, wherein the attestation data includes a representation of hardware of the prover device.

8. The prover device of claim 1, wherein the attestation data includes a representation of firmware of the prover device.

9. The prover device of claim 1, wherein the attestation data includes a representation of software of the prover device.

10. The prover device of claim 1, wherein the second cryptographic representation of the second trust relationship between the verifier device and the trusted computing device includes a pair of asymmetric hash-based multi-time cryptographic keys.

11. The prover device of claim 1, wherein the cryptographic association of the first trust relationship with the second trust relationship of the validation request includes the second cryptographic representation of the second trust relationship digitally signed by the one-or-few-times, hash-based, signature key.

12. A method to obtain attestation from a prover device, the method being executed by a computing platform of a verifier device, and comprising:
    sending an attestation request to the prover device, the attestation request including a cryptographic representation of a first trust relationship between the verifier device and a trusted computing device; and
    receiving an attestation response from the prover device, the attestation response including attestation data describing the prover device and further including a cryptographic representation of a verification of validity of the first trust relationship, and validity of a second trust relationship between the prover device and the trusted computing device, the second trust relationship being cryptographically represented based on a one-or-few-times, hash-based, signature key pair,
    wherein the prover device lacks a trust relationship with the verifier device.

13. The method of claim 12, wherein the attestation response is sent in response to a validation exchange between the prover device and the trusted computing device, wherein the validation exchange is based on a cryptographic association of the second trust relationship and produces the verification of validity of the first trust relationship and the second trust relationship.

14. The method of claim 12, wherein:
    the attestation request includes an instance identifier associated with the attestation request;
    the validation request is based on the instance identifier; and
    the validation response and attestation response are associated with the instance identifier.

15. The method of claim 14, wherein the instance identifier includes a nonce.

16. The method of claim 14, wherein the instance identifier includes an identification of the prover device.

17. The method of claim 14, wherein the instance identifier includes an attribute of the prover device.

18. The method of claim 12, wherein the first cryptographic representation of the first trust relationship between the verifier device and the trusted computing device includes a pair of asymmetric hash-based multi-time cryptographic keys.

19. The method of claim 12, wherein the cryptographic association of the first trust relationship with the second trust relationship includes the first cryptographic representation of the first trust relationship digitally signed by the one-or-few-times, hash-based, signature key.

20. At least one machine-readable medium comprising instructions that, when executed on a computing platform of a trusted device, cause the computing platform to perform operations including:
    storing a first cryptographic representation of a first trust relationship between the trusted device and a prover device, the first cryptographic representation being based on a one-or-few-times, hash-based, signature key;

receiving a validation request from the prover device, the validation request being based on a cryptographic association of the first trust relationship with a second trust relationship, the second trust relationship being between the trusted device and a verifier device, and represented by a second cryptographic representation;

performing a verification of validity of the first trust relationship and the second trust relationship; and in response to a positive result of the verification of validity, sending a validation response to the prover device, the validation response including a cryptographic representation of the positive result, wherein the prover device lacks a trust relationship with the verifier device.

21. The at least one machine-readable medium of claim 20, wherein the validation request further includes a third representation of the first trust relationship and a fourth representation of the first trust relationship.

22. The at least one machine-readable medium of claim 20, wherein the second cryptographic representation of the second trust relationship between the verifier device and the trusted computing device includes a pair of asymmetric hash-based multi-time cryptographic keys.

23. The at least one machine-readable medium of claim 20, wherein the cryptographic association of the first trust relationship with the second trust relationship of the validation request includes the second cryptographic representation of the second trust relationship digitally signed by the one-or-few-times, hash-based, signature key.

* * * * *